US012696943B2

(12) United States Patent
Taguchi et al.

(10) Patent No.: US 12,696,943 B2
(45) Date of Patent: Aug. 4, 2026

(54) MASK

(71) Applicants: KOKEN LTD., Tokyo (JP); Seiji Taguchi, Tokyo (JP); Shingo Ishikawa, Tokyo (JP)

(72) Inventors: Seiji Taguchi, Tokyo (JP); Shingo Ishikawa, Tokyo (JP)

(73) Assignee: KOKEN LTD., Tokyo (JP)

( * ) Notice: Subject to any disclaimer, the term of this patent is extended or adjusted under 35 U.S.C. 154(b) by 426 days.

(21) Appl. No.: 18/010,330

(22) PCT Filed: May 6, 2021

(86) PCT No.: PCT/JP2021/017321
§ 371 (c)(1),
(2) Date: Dec. 14, 2022

(87) PCT Pub. No.: WO2021/256108
PCT Pub. Date: Dec. 23, 2021

(65) Prior Publication Data

US 2023/0337763 A1 Oct. 26, 2023

(30) Foreign Application Priority Data

Jun. 15, 2020 (JP) ................................ 2020-103120

(51) Int. Cl.
*A41D 13/11* (2006.01)
*A62B 23/02* (2006.01)

(52) U.S. Cl.
CPC ...... *A41D 13/1107* (2013.01); *A41D 13/1161* (2013.01); *A62B 23/025* (2013.01)

(58) Field of Classification Search
CPC ........... A41D 13/1107; A41D 13/1161; A41D 13/11; A41D 13/1115; A41D 13/1169;
(Continued)

(56) References Cited

U.S. PATENT DOCUMENTS 1,502,450 A * 7/1924 Wood ................. A41D 13/1146
128/206.16
4,635,628 A * 1/1987 Hubbard ............... B32B 27/065
128/201.17
(Continued)

FOREIGN PATENT DOCUMENTS

EP 3 456 388 A1 3/2019
JP 7-7657 2/1995
(Continued)

OTHER PUBLICATIONS

Yoshiba, JP2015009098A English Translation, Original text Jan. 19, 2015, Translated Dec. 20, 2024 Japan (Year: 2015).*
(Continued)

*Primary Examiner* — Keri J Nelson
(74) *Attorney, Agent, or Firm* — STAAS & HALSEY LLP

(57) ABSTRACT

A mask includes a filter portion that is formed of an air-permeable sheet material and covers at least a nose and a mouth in wearing; a substantially annular face-contacting body that is joined to the filter portion, and is in contact with at least a vicinity of the nose and a vicinity of the mouth on a face in wearing; and a hook string to be hooked around either a head or an ear so that the filter portion and the face-contacting body are worn to the face. Here, a protrusion portion is arranged at least at a part of the face-contacting body to be in contact with at least a vicinity of the nose on the face in wearing to the face and press the filter portion to form a three-dimensional shape allowing the filter portion to conform to unevenness of the face.

18 Claims, 7 Drawing Sheets

(58) Field of Classification Search
CPC ... A41D 13/1176; A62B 18/08; A62B 18/025; A62B 23/025; A62B 23/02
See application file for complete search history.

(56) References Cited

U.S. PATENT DOCUMENTS

| | | | | | |
|---|---|---|---|---|---|
| 5,561,863 | A * | 10/1996 | Carlson, II | A41D 13/1115 | 2/206 |
| 8,528,560 | B2 * | 9/2013 | Duffy | A62B 23/025 | 128/206.19 |
| 2003/0205231 | A1 * | 11/2003 | Shigematsu | A41D 13/11 | 128/206.24 |
| 2009/0078266 | A1 * | 3/2009 | Stepan | A62B 18/084 | 128/206.19 |
| 2015/0173436 | A1 * | 6/2015 | Tsuei | A41D 13/1115 | 2/424 |

FOREIGN PATENT DOCUMENTS

| | | |
|---|---|---|
| JP | 2000-312724 | 11/2000 |
| JP | 2004-329951 | 11/2004 |
| JP | 3105617 | 11/2004 |
| JP | 2005-160499 | 6/2005 |
| JP | 3117120 | 1/2006 |
| JP | 2015-9098 | 1/2015 |
| JP | 2015-181751 | 10/2015 |
| JP | 2016-216835 | 12/2016 |
| WO | WO 202347001737 A1 | 4/2013 |

OTHER PUBLICATIONS

Office Action dated Dec. 4, 2023, in Japanese Application No. 2020-103120.
International Search Report, PCT/ISA/210, dated Jun. 8, 2021, issued in PCT Application No. PCT/JP2021/017321.
Written Opinion, PCT/ISA/237, dated Jun. 8, 2021, issued in PCT Application No. PCT/JP2021/017321.
Indian Office Action issued in counterpart Indian Application No. 202347001737 dated Feb. 18, 2026.

* cited by examiner

MASK

CROSS-REFERENCE TO RELATED APPLICATIONS

This application is a national stage application of International Application PCT/JP2021/017321 filed May 6, 2021, and claims priority to Japan Patent Applications No. 2020-103120, filed on Jun. 15, 2020, the disclosures of which are incorporated by reference herein in its their entireties.

FIELD

The present invention relates to a mask suitable for use in various applications such as a dust-proof mask and a medical mask.

BACKGROUND

Conventionally, various masks are required to prevent external harmful substances and viruses from being inhaled through the mouth and nose of a wearer, and to prevent droplets and the like contained in the exhalation air of the wearer from being scattered to the outside.

Accordingly, it is desirable that a peripheral edge portion and a vicinity of the peripheral edge portion of each of various masks are in close contact with a vicinity of the mouth and nose of the wearer as closely as possible. Patent Documents 1 to 3 are conventionally known as inventions for bringing various masks into close contact with a vicinity of the mouth and nose of a wearer.

Patent Document 1 discloses a mask having a configuration in which an annular member forming a ring is provided inside a cup-shaped filter portion, and a tab-shaped portion formed by providing a notch in an upper part of the annular member is folded back in a direction toward the face of a mask wearer.

Patent Document 2 discloses a mask having a configuration in which a nose piece having a predetermined shape and plastic deformability is arranged along an upper edge portion of a mask body, a sheet-like exhalation blocking material having flexibility and resilience is joined to the mask body in the vicinity of the nose piece, and a free end of the exhalation blocking material is folded inward to be fitted to the face by its resilience.

Patent Document 3 discloses a mask including a main body portion including a filter portion having pleats and a face-contacting cloth crimped to the filter portion, and a holding portion attached to the main body portion for holding the main body portion so as to cover a lower part of the face of a wearer.

LIST OF DOCUMENTS

Patent Documents

Patent Document 1: Japanese Patent Application Publication No. 2005-160499
Patent Document 2: Japanese Patent Application Publication No. 2015-181751
Patent Document 3: Japanese Patent Application Publication No. 2016-216835

SUMMARY

Technical Problem

However, the mask disclosed in Patent Document 1 described above has a configuration in which a band-shaped flap arranged above the filter portion is folded back in a direction (outward direction) opposite to the face of the mask wearer, and the flap is brought into contact with a nose section and an upper part of the face of the wearer. Further, the mask disclosed in Patent Document 2 has a configuration in which a band-shaped nose piece, which is joined to and arranged at an upper part of a mask body, is folded back in a direction (inward direction) toward the face of a wearer and is brought into contact with a nose section and an upper part of the face of the wearer.

Since the flap in Patent Document 1 is a thin member and the area of the end surface thereof is small, the contact area between the flap and the face of the wearer is extremely small. Further, due to the difference in protrusion between the nose section and the cheek sections of the wearer's face, the end surfaces of the flap of Patent Document 1 come into line contact with the cheek sections of the wearer and the folded surface comes into surface contact with the nose section, and a gap is likely to be formed between the face and the mask at the boundary between the line contact region and the surface contact region.

Further, in the mask disclosed in Patent Document 2, the length of the nose piece is short, and the area of the entire nose piece is also small. In use, a band-shaped surface about 10 mm in length of the nose piece only abuts against the wearer's face, and the end of the nose piece in use is an unfixed free end and is easily to move in position. Therefore, it is difficult to strongly press the nose piece against the nose section of the wearer. Therefore, according to the masks disclosed in Patent Document 1 and Patent Document 2, it is not possible to strongly press the mask against the face of the wearer to bring the mask into close contact with the face of the wearer, particularly in a portion that comes into contact with the nose and the vicinity of the nose, and thus the contact pressure and the contact state at the nose and the vicinity of the nose tend to become unstable. Therefore, the masks disclosed in Patent Document 1 and Patent Document 2 have a problem that a gap is likely to be formed between the mask and the face of the wearer.

Further, in Patent Document 3, there is a face-contacting cloth to be brought into close contact with the face of the wearer, but the face-contacting cloth has a planar shape, and it is difficult to fit the face-contacting cloth to the unevenness of the face of the wearer in wearing, in particular, the nose section of the wearer having a large protrusion, and therefore, there is a problem that a gap is likely to be formed between the mask and the face of the wearer at a section having large unevenness of the face including the nose section of the wearer.

The present invention has been made in view of such problems, and an object of the present invention is to provide a mask capable of ensuring excellent contact with the face of a wearer.

Solution to Problem

To solve such problems, a mask according to features of the present invention includes a filter portion that is formed of an air-permeable sheet material and covers at least a nose and a mouth in wearing; a substantially annular face-contacting body that is formed of an elastic material, joined to the filter portion, and is in contact with at least a vicinity of the nose and a vicinity of the mouth on a face in wearing; and a hook string to be hooked around either a head or an ear so that the filter portion and the face-contacting body are worn to the face. Here, a protrusion portion is arranged at least at a part of the face-contacting body to be in contact with at least a vicinity of the nose on the face in wearing to the face and press the filter portion to form a three-dimensional shape allowing the filter portion to conform to unevenness of the face.

In a preferred embodiment of the present invention, the protrusion portion is formed at the face-contacting body as a protrusion piece portion having a protruding piece shape protruding downward from an upper side is provided and at least a part of the protrusion piece portion is folded so as to have a three-dimensional shape.

In a preferred embodiment of the present invention, a cutout portion is formed at the protrusion piece portion in a direction of narrowing the width direction of the protrusion, and the protrusion piece portion is folded with respect to the cutout portion to form the protrusion portion.

In a preferred embodiment of the present invention, the filter portion and/or the face-contacting body is provided with a nose clip which is formed in a band shape, is arranged along a substantially lateral direction of the face at a position where the nose clip comes into contact with the nose in wearing to the face, and maintains a state in which the filter portion and/or the face-contacting body is bent along a shape of the nose by bending the band shape into a substantially V shape, a pair of the protrusion portions are arranged on both sides of the nose, and the nose clip is arranged such that both ends thereof are located above arrangement positions of the pair of protrusion portions, respectively.

In a preferred embodiment of the present invention, a position where the upper side of the hook string is joined to the filter portion and/or the face-contacting body is substantially the same in the up-down direction as a position where the nose clip is arranged.

In a preferred embodiment of the present invention, an extension portion extending downward from the face-contacting body is formed below the face-contacting body, and a lower side of the hook string is joined to the filter portion at the extension portion.

Effects of the Invention

According to the mask of the present invention, at least a part of the face-contacting body having elasticity is provided with protrusion portions which come into contact with at least the vicinity of the nose of the face and press the filter portion in wearing to the face, and form the filter portion into a three-dimensional shape conforming to the unevenness of the face, whereby the face-contacting body can be elastically deformed when the wearer wears the mask, and the filter portion can form and maintain the three-dimensional shape along the unevenness of the face. Further, since the protrusion portions are brought into contact with at least the vicinity of the nose of the face and elastically deformed, the protrusion portions each having the three-dimensional shape are brought into close contact with the nose section of the mask over a large area of the vicinity of the nose of the wearer, and it is possible to prevent a gap from being formed between the vicinity of the nose having large unevenness and the mask. Accordingly, it is possible to ensure excellent contact with the face of the wearer.

Further, according to the mask of the present invention, the protrusion piece portions each having a protruding piece shape protruding downward from above are provided, and at least a part of each of the protrusion piece portions is folded so as to have a three-dimensional shape to form each of the protrusion portions. Thus, the three-dimensionally-shaped protrusion portions can be formed by the protrusion piece portions each made of a plate-shaped member. Therefore, the protrusion portions can be formed from a general-purpose plate-shaped fabric or material. Further, when not in use, the protrusion portions can be formed to be a plate shape so that the mask does not become bulky. This makes it possible to easily manufacture the mask, which can ensure excellent contact with the face of the wearer using a general-purpose fabric or material, and to make the mask not bulky when not in use.

Further, according to the mask of the present invention, the protrusion piece portions are folded with respect to the cutout portions formed in a direction of narrowing the width direction of the protrusions to form the protrusion portions. This makes it easy to determine the folding positions of the protrusion piece portions and to fold the protrusion piece portions resulting in facilitating forming of the use shape of the mask, and enhancing convenience of use of the mask.

Further, according to the mask of the present invention, since the nose clip for maintaining the state in which the filter portion and/or the face-contacting body are bent along the shape of the nose is provided, by folding the nose clip in a V shape, the vicinity of the portion of the mask corresponding to the nose of the wearer can be easily formed and maintained in a shape along the unevenness of the nose. Then, the degree of contact of the filter portion and the face-contacting body with vicinity of the nose of the wearer is further improved. Further, since the protrusion portions are arranged as a pair on both sides of the nose, and the nose clip is configured such that both ends thereof are positioned above the positions of the pair of protrusion portions, respectively, it is possible to easily form and maintain a state in which the protrusion portions are pressed against the nose of the wearer only by folding the nose clip into a V shape. Thus, only by simple procedure of folding the nose clip, the protrusion portions can be pressed against the nose of the wearer and elastically deformed, and the protrusion portions can be maintained in close contact with the vicinity of the nose of the wearer. Then, the degree of contact of the protrusion portions with the vicinity of the nose of the wearer is further improved. Thus, it is possible to provide the mask which ensures excellent contact with the face of the wearer with simple wearing procedure.

According to the mask of the present invention, the position where the upper side of the hook string is joined to the filter portion and/or the face-contacting body is substantially the same as the position where the nose clip is arranged in the up-down direction, so that the pulling force on the upper side of the hook string in the lateral direction serves as the pressing force of the nose clip toward the face, further improving the degree of contact of the protrusion portions with the vicinity of the nose of the wearer. Accordingly, it is possible to ensure excellent contact with the face of the wearer.

Further, according to the mask of the present invention, the extension portion extending downward from the face-contacting body is formed on the lower side of the face-contacting body, and the lower side of the hook string is joined to the filter portion at the extension portion. Thus, the tension force in the lateral direction on the lower side of the hook string serves as the pressing force of the face-contacting body in the direction toward the face. This further improves the degree of contact of the protrusion portions with the vicinity of the nose and mouth. Accordingly, it is possible to ensure excellent contact with the face of the wearer.

DETAILED DESCRIPTION

Hereinafter, masks according to an embodiment of the present invention will be described with reference to FIGS. 1 to 7.

Figure 1:
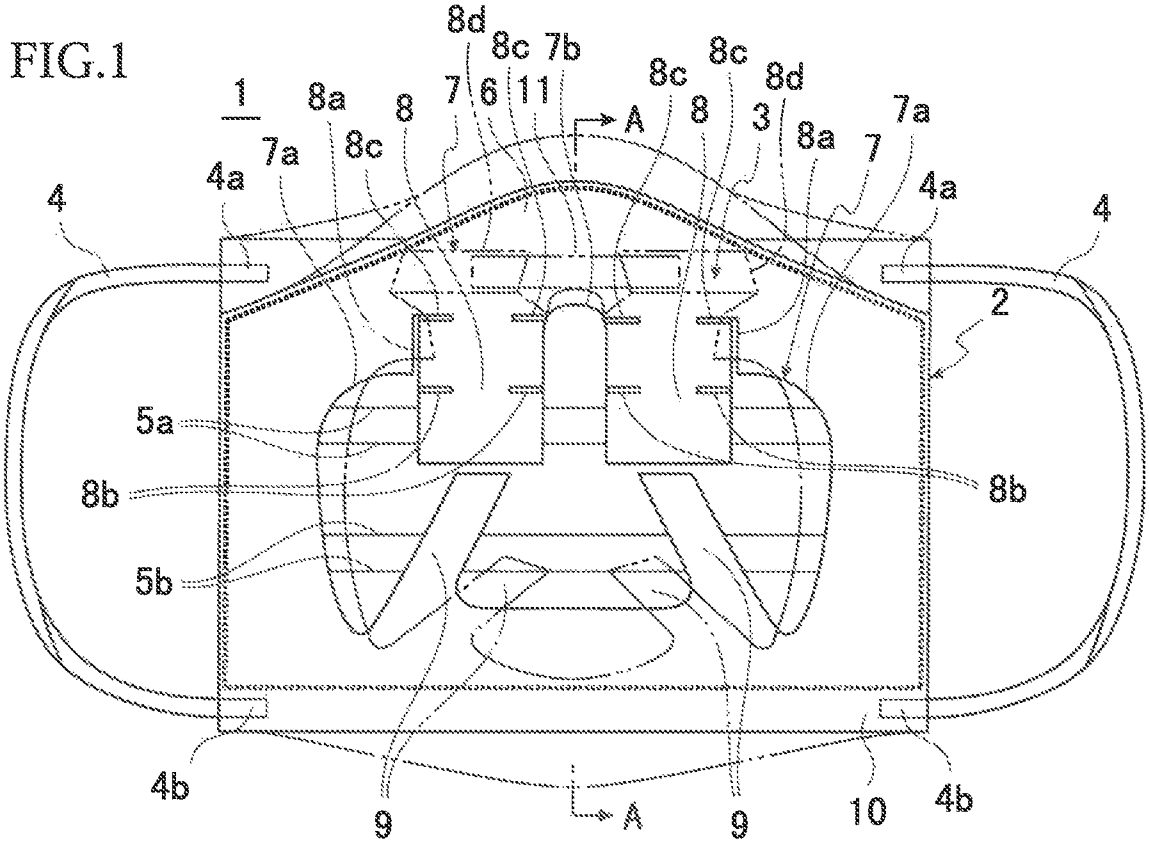
FIG. 1 is a rear view showing a mask according to a first embodiment of the present invention.
Figure 2:
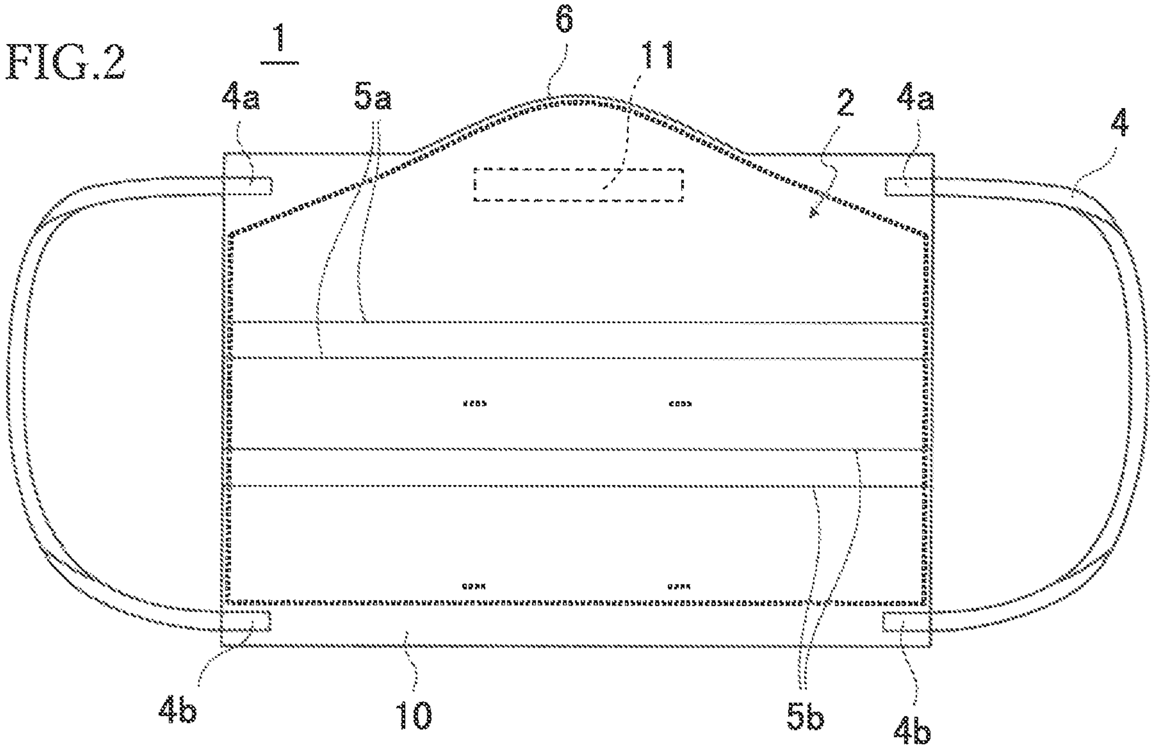
FIG. 2 is a front view showing the mask of the first embodiment.

A mask 1 of the present embodiment shown in FIGS. 1 and 2 is a so-called pleat-type unwoven fabric mask which is mainly used for the purpose of suppressing inhalation of particles such as pollens and dust, suppressing scattering of droplets contained in exhalation air of the wearer, and the like. However, the mask 1 of the present embodiment may be used for an unwoven fabric mask having no pleat, or may be a mask 1 used for various purposes such as cold prevention and medical treatment.

As shown in FIGS. 1 and 2, the mask 1 of the present embodiment includes a filter portion 2, a face-contacting body 3 that abuts on the face of a wearer, and a pair of left and right hook strings 4, 4 that are hooked on the left and right ears of the wearer, respectively.

The filter portion 2 is formed of an air-permeable sheet material, such as unwoven fabric, having air permeability and being capable of suppressing passage of particles such as pollens and dust or particles such as droplets contained in exhalation air of the wearer. As shown in FIG. 2, the filter portion 2 is generally formed in a substantially rectangular shape as a whole in front view, but a protruding portion 6 protruding in a substantially arc shape toward the upper side is formed around an upper part at the center in the lateral direction. Owing to that the protruding portion 6 is arranged, a part corresponding to the nose of the wearer of the mask 1 is brought into contact with the nose at a position where the protrusion thereof is as small as possible, thereby preventing occurrence of a gap and preventing an upper side of the mask 1 from covering the eyes of the wearer to ensure a good wearing state.

For example, in a front view shown in FIG. 2, the filter portion 2 is formed to have a length in the lateral direction of about 155 mm, a length in the up-down direction of both sides of about 110 mm, and a length in the up-down direction of the protruding portion 6 of about 10 mm. However, not limited to this size, any size may be used as long as the size allows the face of the wearer to be in close contact during use, thereby providing a good wearing state, a dust-proof function, and a scattering prevention function.

As shown in FIG. 2, the filter portion 2 is provided with a plurality of pleats extending in the lateral direction. To be specific, two upper pleats 5*a* which are mountain-folded upward are formed above the central part of the filter portion 2 in the up-down direction, and two lower pleats 5*b* which are mountain-folded downward are formed below the central part in the up-down direction. The depth of the fold of each of the upper pleats 5*a* and the lower pleats 5*b* is, for example, about 7 mm. However, the depth of the folds, the number, the length in the lateral direction, and orientation of the folds in the up-down direction of the upper pleats 5*a* and the lower pleats 5*b* may be arbitrary as long as they can provide a comfortable wearing state as forming a three-dimensional shape along the face of the wearer in wearing.

Figure 4:
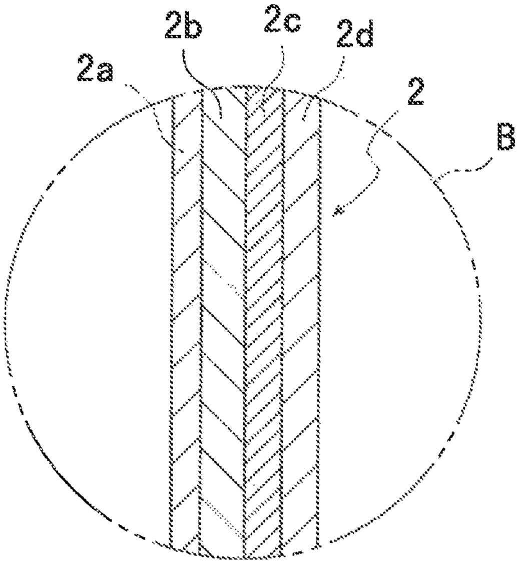
FIG. 4 is an enlarged sectional view showing a portion B in FIG. 3.

As shown in FIG. 4, the filter portion 2 includes, for example, four layers layered in this order from the outside to the inside: a prefilter 2*a* having large fiber diameters for improving appearance while adsorbing moisture and filtering large dust, main filters 2*b*, 2*c* having small fiber diameters for filtering fine dust, and a water-absorbing filter 2*d* for mainly absorbing moisture in exhalation of the wearer. When the filter portion 2 has a three-layer structure, the main filters 2*b*, 2*c* are formed into a single-layer structure including only the main filter 2*b*. Note that the material of the filter portion 2 is not particularly limited as long as the material is soft and bendable, is capable of allowing to take in inhalation air and discharge exhalation air of the wearer, and provides functions as a filter portion capable of filtering the inhalation air and exhalation air and capturing particles such as external pollens and dust.

As shown in FIG. 1, the face-contacting body 3 is formed by punching from an elastically deformable flat plate material. As the face-contacting body 3, for example, an air-impermeable foamed resin material such as a foamed polyethylene sheet or a foamed polyvinyl alcohol sheet to which unwoven fabric or pulp is attached is used.

As shown in FIG. 2, the shape of the outer peripheral of the face-contacting body 3 is formed in a substantially pentagonal shape in front view in which both ends in the lateral direction are substantially vertical, the lower side in the up-down direction is substantially horizontal, and the upper side in the up-down direction is a mountain shape convex upward. For example, in front view shown in FIG. 2, the face-contacting body 3 is formed to have a length in the lateral direction of about 150 mm, a length in the up-down direction of both sides of about 80 mm, and a length in the up-down direction of the upward mountain portion of about 30 mm. However, not limited to this size, any size may be used as long as the size allows the face of the wearer to be in close contact during use, thereby providing a good wearing state, a dust-proof function, and a splash prevention function.

The face-contacting body 3 includes an annular portion 7 formed in a substantially annular shape with an opening formed at a substantially central part in front view. Specifically, the annular portion 7 includes side annular portions 7*a*, 7*a* which are formed to open on both sides in the lateral direction, a central annular portion 7*b* which is formed to open at the central part in the lateral direction, and a continuous portion 7*c* which is formed to open so as to connect the central annular portion 7*b* to the side annular portions 7*a*.

The side annular portions 7*a* and 7*a* are formed in a substantially fan shape having, for example, a size in the up-down direction of about 40 mm and a size in the lateral direction of about 20 mm so as to accommodate protrusions of the cheek sections of the wearer in wearing, and the central annular portion 7*b* is formed in a substantially triangular shape having, for example, a size in the op-down direction of about 60 mm and a size at a lower part in the lateral direction of about 50 mm so as to accommodate protrusions of the nose and mouth of the wearer in wearing.

The lower ends of the side annular portions 7*a*, 7*a* are formed so as to be located below the lower end (a hook portion 23 to be described later) of the central annular portion 7*b* by about 10 mm, so that the mask 1 is less likely to be displaced by movement of the wearer's mouth. However, as long as the respective functions can be appropriately performed, the dimensions of the side annular portions 7*a*, 7*a*, the central annular portion 7*b* formed to open at the central part in the lateral direction, and the like are not limited to the above, and may be arbitrary.

A peripheral edge portion 7*d* of the face-contacting body 3 is joined to a peripheral edge portion of the filter portion 2 via fixing means such as welding or bonding. That is, in the face-contacting body 3, only the peripheral edge portion 7*d* is joined to the peripheral edge portion of the filter portion 2, and the other portions are not joined and merely overlap each other. Therefore, the face-contacting body 3 can be separated from the filter portion 2.

In the annular portion 7 of the face-contacting body 3, a pair of upper piece portions 8, 8 as a "protruding piece portion" and a "protruding portion" are arranged to protrude on the upper side, and a pair of lower piece portions 9, 9 are arranged to protrude on the lower side.

The upper piece portion 8 is formed in a band shape and protrudes downward. In the present embodiment, the length of the upper piece portion 8 in the up-down direction on the central side in the lateral direction is, for example, about 35 mm, and the length of the lower end in the lateral direction is, for example, about 30 mm, being lengths to increase the contact area with the nose and increase the frictional force so as to enable the mask to be hardly displaced in wearing. A longitudinal slit 8*a* extending in the up-down direction is formed by cutting out at an outer side of each upper piece portion 8 in the lateral direction. The longitudinal slit 8*a* is, for example, approximately 10 mm in length and is arranged corresponding to a folded part when a protrusion portion 8*d* is formed using the upper piece portion 8.

A pair of first lateral slits 8*b*, 8*b* as "cutout portions" and a pair of second lateral slits 8*c*, 8*c* as "cutout portions" are formed as cutout in a substantially central part of the upper piece portion 8 in the up-down direction along the lateral direction. The first lateral slits 8*b*, 8*b* and the second lateral slits 8*c*, 8*c* are, for example, approximately 10 mm in length, and have a function of facilitating forming the protrusion portion 8*d* (described later) by folding the upper piece portion 8. Note that dimensions of the longitudinal slits 8*a*, 8*a*, the first lateral slits 8*b*, 8*b*, and the second lateral slits 8*c*, 8*c* are not limited to those described above as long as the respective functions are achieved.

The lower end of the central annular portion 7*b* of the face-contacting body 3 forms a hook portion 23 for hooking the chin of the wearer. The pair of lower piece portions 9, 9 arranged on both sides of the hook portion 23 are formed in a substantially band shape to protrude upward. The lower piece portions 9, 9 have a size in the up-down direction of, for example, about 20 mm and a size in the lateral direction of, for example, about 12 mm, and are in close contact with both sides of the mouth of the wearer in wearing. The upper ends of the lower piece portions 9, 9 face the vicinities of the lower ends of the upper piece portions 8, 8, respectively.

An extension portion 10 in which the lower side of the filter portion 2 is extended downward is formed below the lower end of the face-contacting body 3. The extension portion 10 is formed to have a size in the up-down direction of, for example, about 10 mm. The extension portion 10 is in close contact with the lower face of the wearer in wearing, provides excellent fit, and has a function of preventing particles such as external pollens and dust from flowing into the inside and preventing particles such as droplets contained in exhalation air of the wearer from leaking to the outside. Note that dimensions of the extension portion 10 are not limited to those described above as long as the above function is appropriately performed.

A band-shaped nose clip 11 is arranged at a central part in the lateral direction as a "substantially horizontal direction" above the mask 1 as being sandwiched between the filter portion 2 and the face-contacting body 3. The nose clip 11 is made of a material having high rigidity, such as stretched polyethylene, and capable of maintaining a shape in a folded state.

The nose clip 11 has a length in the longitudinal direction of, for example, about 50 mm or less, preferably about 40 mm. The nose clip 11 is arranged, approximately at the center in the lateral direction of the face-contacting body 3, at an intermediate region between a virtual horizontal line connecting upper ends of both sides of the face-contacting body 3 and an upper end of the face-contacting body 3 which is a top of an upper mountain-shaped portion, to be specific, at a position of, for example, about 15 mm from the upper end of the face-contacting body 3, symmetrically in such a manner that the longitudinal direction thereof is along the lateral direction of the mask 1. The nose clip 11 is bent along the shape of the nose of the wearer at the time of wearing to bring the filter portion 2 and the face-contacting body 3 into close contact with the nose of the wearer. Note that dimensions of the nose clip 11 are not limited to those described above as long as the above function is appropriately performed.

A pair of left and right hook strings 4, 4 are joined to both sides of the filter portion 2. Each of the hook strings 4, 4 is made of an elastically stretchable rubber string and is flat and long enough to fit the mask 1 to the face of the wearer, for example, 200 mm long. Here, the length of the hook strings 4, 4 may be longer or shorter than the length described above. Note that the pair of left and right hook strings 4, 4 may be made of a known elastic material such as unwoven fabric, woven fabric, and a plastic film.

In each of the hook strings 4, 4 one end 4*a* on the upper side is joined to the filter portion 2 at a position whose height is substantially the same as the height of the nose clip 11 in the up-down direction, and the other end 4*b* on the lower side is joined to an end of the extension portion 10. The position at which the one end 4*a* of the hook string 4 is arranged may be slightly deviated from the height of the nose clip 11 in the up-down direction as long as appropriate pressing force can be applied to the nose clip 11 in the direction to the face in wearing.

Next, description will be provided on a method for use and effects of the mask 1 of the present embodiment.

The mask 1 is in a flattened state by folding of the upper pleats 5*a* and the lower pleats 5*b*. As a result, the mask 1 is not bulky when packed, so that it can be transported and stored very easily.

When the mask 1 is worn to the face of the wearer, the upper piece portions 8, 8 are folded outward (toward the filter portion 2) at the positions where the first lateral slits 8*b*, 8*b* and the second lateral slits 8*c*, 8*c* are arranged. After being folded, the pair of upper piece portions 8, 8 are thereby formed as a pair of protrusion portions 8*d*, 8*d* having a substantially triangular shape in side view. At this time, the protrusion portions 8*d*, 8*d* are formed in the vicinities of both ends of the nose clip 11.

Figure 5:
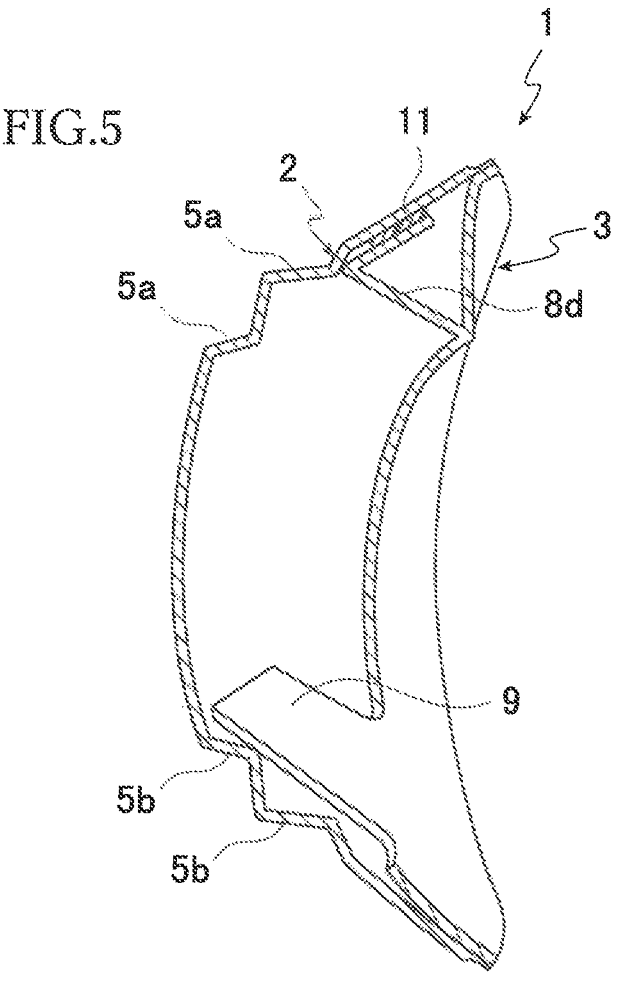
FIG. 5 is a schematic sectional view showing a state of a filter portion and a face-contacting body when the mask of the first embodiment is worn.
Figure 6:
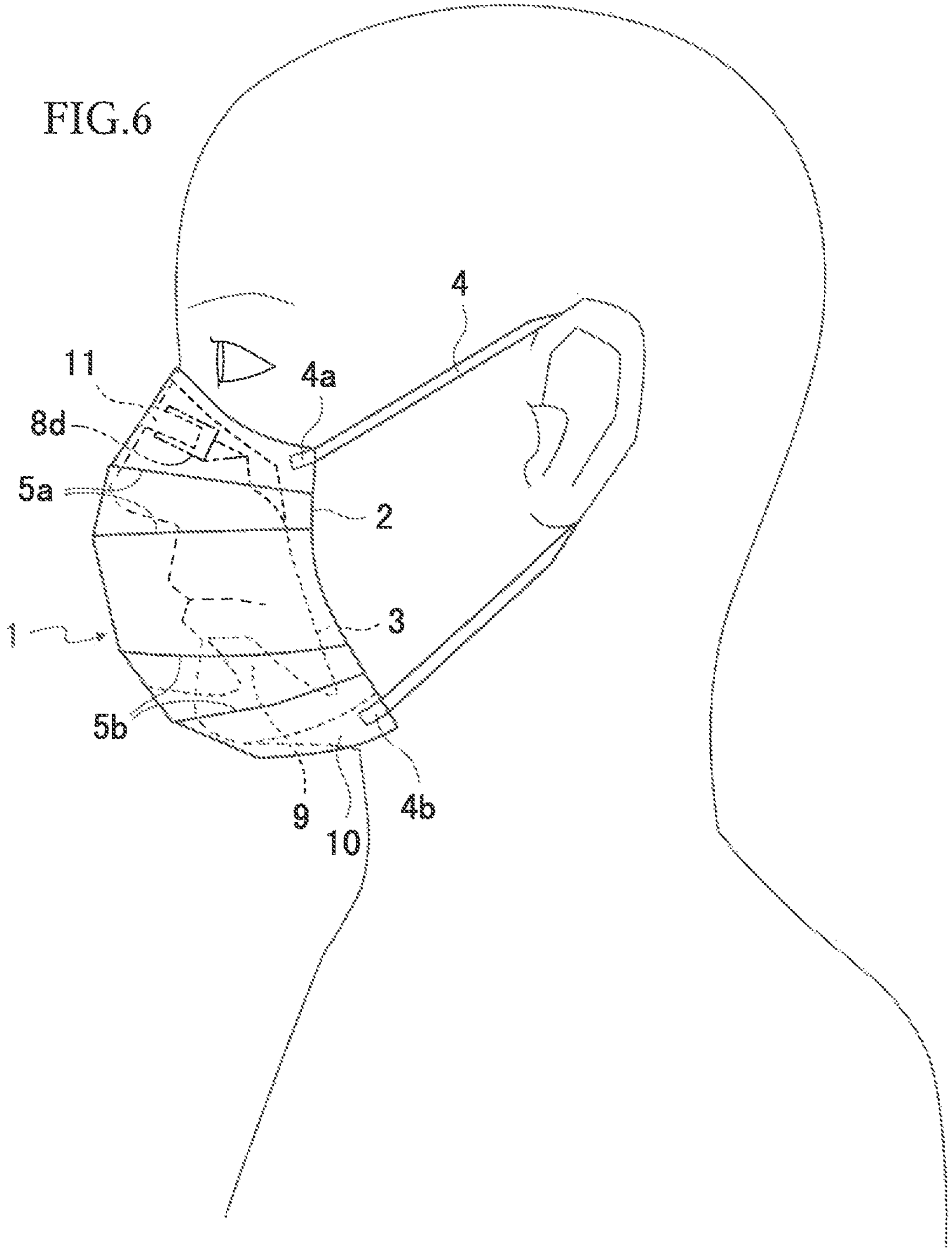
FIG. 6 is a side view showing a state in which the mask of the first embodiment is worn by a wearer.
Figure 7:
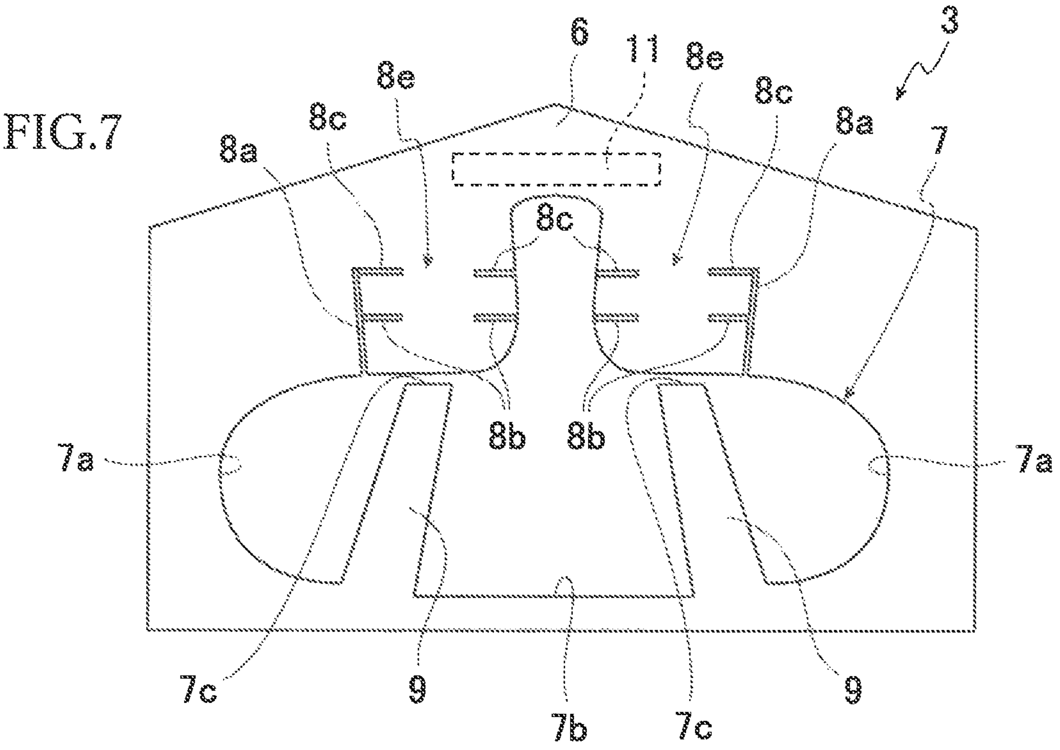
FIG. 7 is a conceptual view showing an example of a variation of the face-contacting body of the present invention.

In this state, the face-contacting body 3 side of the mask 1 is applied to the face of the wearer, and the nose clip 11 is bent along the protrusion of the nose in a substantially V shape having the substantially central part in the lateral direction as the apex of the protrusion. As a result, as schematically shown in FIG. 5, the nose clip 11 of the mask 1 and the vicinity thereof are positioned at the nose of the wearer and the vicinity thereof. In particular, the pair of protrusion portions 8*d*, 8*d* formed in the vicinities of both ends of the nose clip 11 are elastically deformed by being pressed toward the nose of the wearer by the shape deformation of the nose clip 11, and are fixed in close contact with both sides of the nose of the wearer as schematically shown in FIG. 6.

Figure 3:
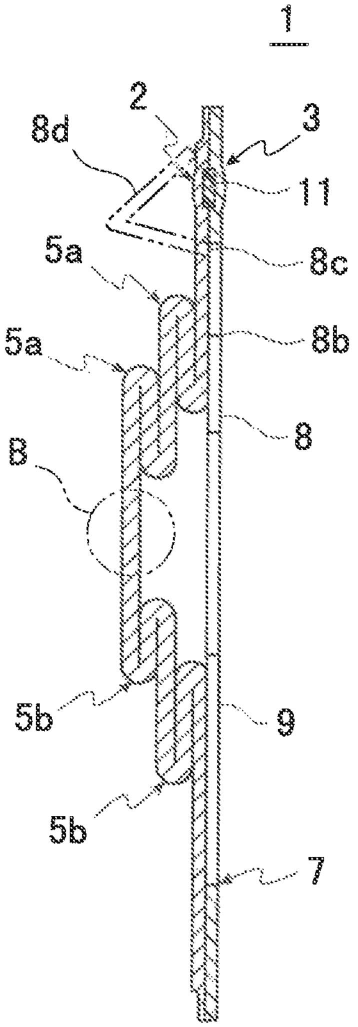
FIG. 3 is a sectional view at line A-A in FIG. 1.

Here, each of the protrusion portions 8*d*, 8*d* has a substantially triangular three-dimensional shape in side view as shown by the imaginary line in FIG. 3. Therefore, the elastic force is larger than that in the state in which each of the upper piece portions 8 is kept in a flat plate shape. The elastic force of the protrusion portions 8*d*, 8*d* when the protrusion portions 8*d*, 8*d* are pressed against the nose of the wearer is larger than the elastic force when the upper piece portions 8, 8 are pressed against the nose of the wearer as they are. Therefore, the protrusion portions 8*d*, 8*d* are elastically deformed along the shape of the protrusion of the nose of the wearer to fit to the nose of the wearer, so that occurrence of a gap between the mask 1 and the nose of the wearer can be suppressed with high reliability.

Further, as schematically shown in FIG. 5, due to that the protrusion portions 8*d*, 8*d* protrude outward, the filter portion 2 around the vicinity of the nose is pushed outward and a space is formed from the filter portion 2 to the vicinity of the nose and mouth.

In this state, the pair of left and right hook strings 4, 4 are hooked on the ears of the wearer. Next, the wearer holds both side parts of the mask 1 with his/her hands and spreads the mask 1 in the lateral direction, and holds the upper and lower ends and spreads the mask 1 in the up-down direction, thereby shaping the mask 1.

Then, the mask 1 is pressed toward the face of the wearer by the elasticity of the hook strings 4, 4 and the mask 1 is worn in a state of being fitted to the face of the wearer as schematically shown in FIG. 6.

Specifically, the nose and mouth of the wearer are located inside the central annular portion 7*b* of the face-contacting body 3 of the mask 1, and the cheeks of the wearer are located inside the side annular portions 7*a*, 7*a*, respectively. Then, both sides of the nose are sandwiched and fixed between the pair of protrusion portions 8*d*, 8*d*. The lower piece portions 9, 9 are elastically deformed and fixed to the vicinity of the mouth of the wearer in a shape along the three-dimensional shape of the vicinity of the mouth of the wearer.

Further, since the tension of the hook strings 4, 4 acts as a force for pressing the nose clip 11 located between the ends 4*a*, 4*a* on the upper side of the hook strings 4, 4 toward the face of the wearer, as schematically shown in FIG. 6, the filter portion 2 and the face-contacting body 3 around the nose clip 11 are firmly fixed while being fitted to the face of the wearer. Thus, when the mask 1 is used, the positioning at the vicinity of the nose of the wearer can be maintained. Further, since the tension of the hook strings 4, 4 serves as a force for pressing the nose clip 11 toward the face of the wearer, the protrusion portions 8*d*, 8*d* are elastically deformed and fitted to the nose of the wearer, and the protrusion portions 8*d*, 8*d* are more firmly fixed in close contact with both sides of the nose of the wearer. Accordingly, when the mask 1 is used, it is possible to prevent particles such as external pollens and dust from flowing into the inside and particles such as droplets contained in the exhalation air of the wearer from leaking to the outside due to a gap formed between the mask 1 and the vicinity of the nose of the wearer.

As schematically shown in FIG. 5, the protrusion portions 8*d*, 8*d* push the filter portion 2 at the vicinity of the nose of the wearer outward while the protrusion portions 8*d*, 8*d* are in close contact with both sides of the nose of the wearer. By forming a space from the filter portion 2 to the nose and mouth of the wearer, it is possible to prevent the filter portion 2 from sticking to the nose and mouth of the wearer when the wearer breathes in wearing. As a result, it is possible to prevent the wearer from feeling stuffy.

Further, since the tension of the hook strings 4, 4 act as force for pressing the extension portion 10 of the filter portion 2 located between the ends 4*b*, 4*b* on the lower side of the hook strings 4, 4 toward the face of the wearer, as schematically shown in FIG. 6, the filter portion 2 at the lower end of the mask 1 including the extension portion 10 is firmly fixed while being fitted to the face of the wearer. Accordingly, when the mask 1 is used, it is possible to prevent particles such as external pollens and dust from flowing into the inside and particles such as droplets contained in the exhalation air of the wearer from leaking to the outside due to a gap formed between the lower part of mask 1 and the vicinity of the chin of the wearer.

Further, in this state, the upper pleats 5*a* and the lower pleats 5*b* of the filter portion 2 of the mask 1 are widened, and the filter portion 2 is brought into a state of being along the uneven shape of the face of the wearer. As a result, the wearer can use the mask 1 with excellent fit, and can prevent particles such as external pollens and dust from flowing into the inside and particles such as droplets contained in exhalation air of the wearer from leaking to the outside.

Further, after use, the wearer removes the hook strings 4, 4 from the ears, opens the folds at the positions of the first lateral slits 8*b*, 8*b* and the second lateral slits 8*c*, 8*c* of the protrusion portions 8*d*, 8*d* to return to the state of the flat plate-shaped upper pieces portions 8, 8, returns the nose clip 11 from the substantially V shape to a flat plate-shape, and returns the upper pleats 5*a* and the lower pleats 5*b* to the folded state. As a result, the mask 1 can be returned to a flat plate shape that can be accommodated or stored without being bulky.

As described above, in the present embodiment, at least a part of the face-contacting body 3 having elasticity is provided with protrusion portions 8*d*, 8*d* which come into contact with at least the vicinity of the nose of the face and press the filter portion 2 in wearing to the face, and form the filter portion 2 into a three-dimensional shape conforming to the unevenness of the face, whereby the face-contacting body 3 can be elastically deformed when the wearer wears the mask 1, and the filter portion 2 can form and maintain the three-dimensional shape along the unevenness of the face. Further, since the protrusion portions 8*d*, 8*d* are brought into contact with at least the vicinity of the nose of the face and elastically deformed, the protrusion portions 8*d*, 8*d* each having the three-dimensional shape are brought into close contact with the vicinity of the nose of the mask 1 over a large area of the vicinity of the nose of the wearer, and it is possible to prevent a gap from being formed between the vicinity of the nose having large unevenness and the mask 1. Accordingly, it is possible to ensure excellent contact with the face of the wearer.

Further, in the present embodiment, the upper piece portions 8, 8 each having a protruding piece shape protruding downward from above are provided, and at least a part of each of the upper piece portions 8, 8 is folded so as to have a three-dimensional shape to form each of the protrusion portions 8*d*, 8*d*. Thus, the three-dimensionally-shaped protrusion portions 8*d*, 8*d* can be formed by the upper piece portions 8, 8 each made of a plate-shaped member. Therefore, the protrusion portions 8*d*, 8*d* can be formed from a general-purpose plate-shaped fabric or material. Further, when not in use, the protrusion portions 8*d*, 8*d* can be formed to be plate-shaped upper piece portions 8, 8 so that the mask 1 does not become bulky. This makes it possible to easily manufacture the mask 1, which can ensure excellent contact with the face of the wearer using a general-purpose fabric or material, and to make the mask not bulky when not in use. In addition, by folding the upper piece portions 8, 8 to form the protrusion portions 8*d*, 8*d*, the protrusion portions 8*d*, 8*d* push and expand the filter portion 2 around the vicinity of the nose outward, and a space is formed from the filter portion 2 to the vicinity of the nose and mouth. Accordingly, the ventilation resistance when the wearer breathes is reduced, and the breathing difficulty of the wearer can be reduced.

Further, in the present embodiment, the upper piece portions 8, 8 are folded with respect to the first lateral slits 8*b*, 8*b* and the second lateral slits 8*c*, 8*c* formed in a direction of narrowing the width direction of the protrusions to form the protrusion portions 8*d*, 8*d*. This makes it easy to determine the folding positions of the upper piece portions 8, 8 and to fold the upper piece portions 8, 8 resulting in facilitating forming of the use shape of the mask 1, and enhancing convenience of use of the mask 1.

Further, in the present embodiment, since the nose clip 11 for maintaining the state in which the filter portion 2 and/or the face-contacting body 3 are bent along the shape of the nose is provided, by folding the nose clip 11 in a V shape, the vicinity of the portion of the mask 1 corresponding to the nose of the wearer can be easily formed and maintained in a shape along the unevenness of the nose. Then, the degree of contact of the filter portion 2 and the face-contacting body 3 with the vicinity of the nose of the wearer is further improved. Further, since the protrusion portions 8*d*, 8*d* are arranged as a pair on both sides of the nose, and the nose clip 11 is configured such that both ends thereof are positioned above the positions of the pair of protrusion portions 8*d*, 8*d*, respectively, it is possible to easily form and maintain a state in which the protrusion portions 8*d*, 8*d* are pressed against the nose of the wearer only by folding the nose clip 11 into a V shape. Thus, only by simple procedure of folding the nose clip, the protrusion portions 8*d*, 8*d* can be pressed against the nose of the wearer and elastically deformed, and the protrusion portions 8*d*, 8*d* can be maintained in close contact with the vicinity of the nose of the wearer. Then, the degree of contact of the protrusion portions 8*d*, 8*d* with the vicinity of the nose of the wearer is further improved. Thus, it is possible to provide the mask 1 which ensures excellent contact with the face of the wearer with simple wearing procedure. In the present embodiment, the position where the one end 4*a* on the upper side of the hook string 4 is joined to the filter portion 2 and/or the face-contacting body 3 is substantially the same as the position where the nose clip 11 is arranged in the up-down direction, so that the pulling force of the end 4*a* on the upper side of the hook string 4 in the lateral direction serves as the pressing force of the nose clip 11 toward the face, further improving the degree of contact of the protrusion portions 8*d*, 8*d* with the vicinity of the nose of the wearer. Accordingly, it is possible to ensure excellent contact with the face of the wearer.

In the present embodiment, the extension portion 10 extending downward from the face-contacting body 3 is formed below the face-contacting body 3, and the other end 4*b* being on the lower side of the hook string 4 is joined to the filter portion 2 at the extension portion 10. Thus, the tension force in the lateral direction at the other end 4*b* being on the lower side of the hook string 4 serves as the pressing force of the face-contacting body 3 in the direction toward the face. This further improves the degree of contact of the protrusion portions 8*d*, 8*d* with the vicinity of the nose and mouth. Accordingly, it is possible to ensure excellent contact with the face of the wearer.

In the present embodiment, the entire upper piece portion 8 forms the protrusion portion 8*d*. However, the present invention is not limited thereto, and a part of the upper piece portion 8, for example, only the upper end side, only the lower end side, or only the inner side of the upper piece portion 8 may be folded to form the protrusion portion 8*d*. Further, it is not necessary that both of the pair of upper piece portions 8, 8 are formed as the protrusion portions 8*d*, 8*d*, and only one of the pair of upper piece portions 8, 8 may be formed as the protrusion portion 8*d*.

Further, the protrusion shape of the protrusion portion 8*d* of the present embodiment is a substantially triangular shape in side view, but is not limited thereto, and may be any shape such as a substantially V shape, a substantially U shape, a substantially W shape, or a substantially angular U shape in side view. In the present embodiment, the protrusion portion 8*d* is formed by folding the upper piece portion 8 at the positions of the first lateral slits 8*b*, 8*b* and the second lateral slits 8*c*, 8*c*, but the present invention is not limited thereto, and the protrusion portion 8*d* may be formed by fixing a part of the upper piece portion 8 to another part of the filter portion 2 or a fixing portion (not shown) provided in the face-contacting body 3. Furthermore, the protrusion portion 8*d* is not limited to being formed by folding the upper piece portion 8, and may be formed in a protrusion shape in advance.

In addition, the protrusion portions 8*d*, 8*d* of the present embodiment can also be formed by folding the upper piece portions 8, 8 in a direction opposite to the above-described direction. For example, the upper piece portions 8, 8 are folded inward at the positions of the first lateral slits 8*b*, 8*b* and the second lateral slits 8*c*, 8*c* (so that the folds are located on the face side of the wearer in wearing). Then, after folding, the end (the part that was the lower end before folding) is inserted into the fold portion of the upper pleats 5*a* of the filter portion 2, and the folded shape is fixed. Thus, the pair of upper piece portions 8, 8 are thereby formed as the pair of protrusion portions 8*d*, 8*d* having a substantially triangular shape in side view. In this way, when the ends of the upper piece portions 8, 8 are inserted into and fixed to the fold portions of the upper pleats 5*a*, it is possible to reduce the size of the outward protruding of the filter portion 2 due to the outward pressing of the protrusion portions 8*d*, 8*d*.

Furthermore, in place of the protrusion portion 8*d* of the present embodiment or together with the protrusion portion 8*d* of the present embodiment, a protrusion (not shown) for the purpose of improving the degree of contact with the face in wearing may be provided on one or both of the lower piece portions 9 or any portion other than the upper piece portion 8 and the lower piece portion 9 of the face-contacting body 3.

Further, it is also possible to fold or fold back a part or the whole of the lower piece portion 9 to bring the part or the whole of the lower piece portion 9 into contact with the face of the wearer, bring the lower piece portion 9 into contact with the face of the wearer with a strong contact pressure and a high degree of fit, and improve the degree of contact and airtightness of the mask 1 at the chin and in the vicinity thereof. In this case, the lower piece portion 9 may be folded back toward the face of the wearer (inward direction), may be folded back toward the filter portion 2 (outward direction), or may be subjected to processing such as folding the lower piece portion 9 a plurality of times in the same manner as the upper piece portion 8 of the present embodiment to form a protrusion (not shown), and the protrusion may be brought into contact with the face of the wearer. In this case, the protruding portion (not shown) may have any shape such as a substantially V shape, a substantially triangular shape, a substantially U-shape, or a substantially angular U shape. Further, like the longitudinal slit 8*a*, the first lateral slit 8*b*, 8*b*, and the second lateral slit 8*c*, 8*c* of the upper piece portion 8 of the present embodiment, a configuration for facilitating folding may be provided in the lower piece portion 9.

Further, in the present embodiment, the pair of first lateral slits 8*b*, 8*b* and the pair of second lateral slits 8*c*, 8*c* are provided at the upper piece portion 8 to facilitate folding for forming the protrusion portion 8*d*. However, as a configuration for facilitating folding, any configuration other than the first lateral slits 8*b*, 8*b* and the second lateral slits 8*c*, 8*c* may be provided. For example, a hinge portion or a hole portion may be formed in place of one or both of the first lateral slits 8*b*, 8*b* and the second lateral slits 8*c*, 8*c*, or folds may be formed in advance. Further, the first lateral slits 8*b*, 8*b* and the pair of second lateral slits 8*c*, 8*c* are not limited, respectively, to a pair, and may be only one or three or more. Furthermore, only either of the first lateral slits 8*b*, 8*b* and the second lateral slits 8*c*, 8*c* may be provided as a configuration for folding the upper piece portion 8.

In the present embodiment, the longitudinal slit 8*a* is arranged in the upper piece portion 8, and the upper piece portion 8 can be folded to the upper side of the side annular portion 7*a* to form the protrusion portion 8*d*. However, the upper piece portion 8 without the longitudinal slit 8*a* may be folded to form the protrusion portion 8*d*.

Further, in the present embodiment, the upper piece portion 8 as the "protrusion piece portion" is configured to protrude to the lower side of the side annular portion 7*a*, but the "protrusion piece portion" does not need to protrude more than other members in appearance, and may have any configuration as long as the "protrusion portion" can be formed by processing such as folding. For example, as shown in the conceptual view of the face-contacting body 3 in FIG. 7, the "protrusion piece portion" may be a piece portion 8*e* that forms a part of the annular portion 7 and has an apparent end on an extension line of an adjacent end, but can form a protrusion portion (not shown in FIG. 7) by folding a part inside the longitudinal slit 8*a* along the first lateral slits 8*b*, 8*b* and the second lateral slits 8*c*, 8*c*.

Further, in the present embodiment, the pair of hook strings 4, 4 are hooked on the left and right ears of the wearer, respectively, but the present invention is not limited thereto, and a single string may be used for each of the upper and lower sides to be hooked on the head of the wearer.

Further, in the present embodiment, an example in which two upper pleats 5*a* and two lower pleats 5*b* are formed in the filter portion 2 has been described, but the present invention is not limited thereto, and one upper pleat 5*a* and one lower pleat 5*b* may be formed, or only one set of mountain fold and valley fold may be widely formed in the vicinity of the center of the filter portion 2. Further, only the upper pleats 5*a* may be formed on the upper part of the filter portion 2, or only the lower pleats 5*b* may be formed on the lower part of the filter portion 2. Furthermore, the upper pleat 5*a* and the lower pleat 5*b* may both be upwardly protruding pleats, or both may be downwardly protruding pleats. Further, the plurality of upper pleats 5*a* may have a configuration in which upwardly protruding pleats and downwardly protruding pleats are mixed, or the plurality of lower pleats 5*b* may have a configuration in which upwardly protruding pleats and downwardly protruding pleats are mixed.

In addition, in the present embodiment, an example in which the filter portion 2 is formed in a substantially rectangular shape and the face-contacting body 3 is formed in a substantially pentagonal shape has been described, but the present invention is not limited thereto, and the face-contacting body 3 may be formed in any polygonal shape.

The present invention is not limited to the present embodiment, and any configuration may be employed as long as it is configured such that, when the filter portion 2 is expanded in the up-down direction, the face-contacting body 3 is elastically deformed to follow in the up-down direction, and the left and right parts of the face-contacting body 3 are elastically deformed to come into close contact with the face along the shape of the face.

Note that the embodiment described above are examples of the present invention, and that the present invention is not limited only to the above embodiment.

REFERENCE SIGNS LIST

1 Mask
2 Filter portion
3 Face-contacting body
4 Hook string
4*a* One end
4*b* Other end
7 Annular portion
7*a* Side annular portion
7*b* Central annular portion
8 Upper piece portion (Protrusion piece portion, Protrusion portion)
8*b* First lateral slit (Cutout portion)
8*c* Second lateral slit (Cutout portion)
8*d* Protrusion portion
8*e* Piece portion (Protrusion piece portion)
10 Extension portion
11 Nose clip

What is claimed is:

1. A mask comprising:

a filter portion that is formed of a breathable sheet material to be wearable on a face to cover at least a nose and a mouth of the face;

a face-contacting body that is formed of an elastic material, joined to the filter portion, and is configured to come in contact with at least a vicinity of the nose and a vicinity of the mouth of the face; and a hook strap to be looped around either a head or an ear so that the filter portion and the face-contacting body are wearable on the face, wherein, at least a part of the face-contacting body is provided with a pair of projecting pieces, each projecting piece of the pair of projecting pieces protruding downward from an upper side of the face-contacting body, each projecting piece of the pair of projecting pieces provided with a bending portion, and each projecting piece of the projecting pieces bendable outward toward the filter portion from an inner side corresponding to a face side, with the bending portion serving as a boundary, so as to form a pair of protrusion portions arranged on at least a part of the face-contacting body, the pair of protrusion portions configured to when the mask is worn on the face to respectively contact regions adjacent to both sides of the nose and to press outward the filter portion located on one side of the nose and a projecting piece of the pair of projecting pieces located on other side of the nose, while also pressing the face-contacting body toward the face, so that the pair of protrusions form a three-dimensional shape allowing the filter portion to be pressed outward into a three-dimensional shape and to conform to unevenness of the face and allowing the face-contacting body to closely contact the face.

2. The mask according to claim 1, wherein the pair of projecting pieces are shaped as the pair of protruding pieces extending downward from the upper side of the face-contacting body so that at least a part of each protruding piece of the pair of protruding pieces is bendable outward into the three-dimensional shape so that the face-contacting body is brought into close contact with the face when the mask is worn on the face.

3. The mask according to claim 2, wherein the pair of protrusion portions are formed from a pair of cutout portions of a protrusion portion in a direction of narrowing in a width direction of the protrusion portion, and the protrusion portion is foldable with respect to the pair of cutout portions to form each protrusion portion of the pair of protrusion portions.

4. The mask according to claim 3, wherein the filter portion and/or the face-contacting body is provided with a nose clip which is configured in a band shape to be arranged along a lateral direction of the face at a position where the nose clip comes into contact with the nose, so that the nose clip maintains a state in which the filter portion and/or the face-contacting body is configured to be bent into a V shape along a shape of the nose, and the nose clip is arranged such that both ends of the nose clip are located above arrangement positions of the pair of protrusion portions, respectively.

5. The mask according to claim 4, wherein a position where an upper side of the hook strap is joined to the filter portion and/or the face-contacting body is same in an up-down direction as a position where the nose clip is arranged.

6. The mask according to claim 5, wherein an extension portion extending downward from the face-contacting body is formed below the face-contacting body, and a lower side of the hook strap is joined to the filter portion at the extension portion.

7. The mask according to claim 4, wherein an extension portion extending downward from the face-contacting body is formed below the face-contacting body, and a lower side of the hook strap is joined to the filter portion at the extension portion.

8. The mask according to claim 3, wherein an extension portion extending downward from the face-contacting body is formed below the face-contacting body, and a lower side of the hook strap is joined to the filter portion at the extension portion.

9. The mask according to claim 2, wherein the filter portion and/or the face-contacting body is provided with a nose clip which is configured in a band shape to be arranged along a lateral direction of the face at a position where the nose clip comes into contact with the nose, so that the nose clip maintains a state in which the filter portion and/or the face-contacting body is configured to be bent into a V shape along a shape of the nose, and the nose clip is arranged such that both ends of the nose clip are located above arrangement positions of the pair of protrusion portions, respectively.

10. The mask according to claim 9, wherein a position where an upper side of the hook strap is joined to the filter portion and/or the face-contacting body is same in an up-down direction as a position where the nose clip is arranged.

11. The mask according to claim 10, wherein an extension portion extending downward from the face-contacting body is formed below the face-contacting body, and a lower side of the hook strap is joined to the filter portion at the extension portion.

12. The mask according to claim 9, wherein an extension portion extending downward from the face-contacting body is formed below the face-contacting body, and a lower side of the hook strap is joined to the filter portion at the extension portion.

13. The mask according to claim 2, wherein an extension portion extending downward from the face-contacting body is formed below the face-contacting body, and a lower side of the hook strap is joined to the filter portion at the extension portion.

14. The mask according to claim 1, wherein the filter portion and/or the face-contacting body is provided with a nose clip which is configured in a band shape to be arranged along a lateral direction of the face at a position where the nose clip comes into contact with the nose, so that the nose clip maintains a state in which the filter portion and/or the face-contacting body is configured to be bent into a V shape along a shape of the nose and the nose clip is arranged such that both ends of the nose clip are located above arrangement positions of the pair of protrusion portions, respectively.

15. The mask according to claim 14, wherein a position where an upper side of the hook strap is joined to the filter portion and/or the face-contacting body is same in an up-down direction as a position where the nose clip is arranged.

16. The mask according to claim 15, wherein an extension portion extending downward from the face-contacting body is formed below the face-contacting body, and a lower side of the hook strap is joined to the filter portion at the extension portion.

17. The mask according to claim 14, wherein an extension portion extending downward from the face-contacting body is formed below the face-contacting body, and a lower side of the hook strap is joined to the filter portion at the extension portion.

18. The mask according to claim 1, wherein an extension portion extending downward from the face-contacting body is formed below the face-contacting body, and a lower side of the hook strap is joined to the filter portion at the extension portion.

* * * * *